Sept. 27, 1938.　　　　　　　J. CAGE　　　　　　　2,131,093
DISPLAY BOX
Filed April 18, 1936　　　　7 Sheets-Sheet 1
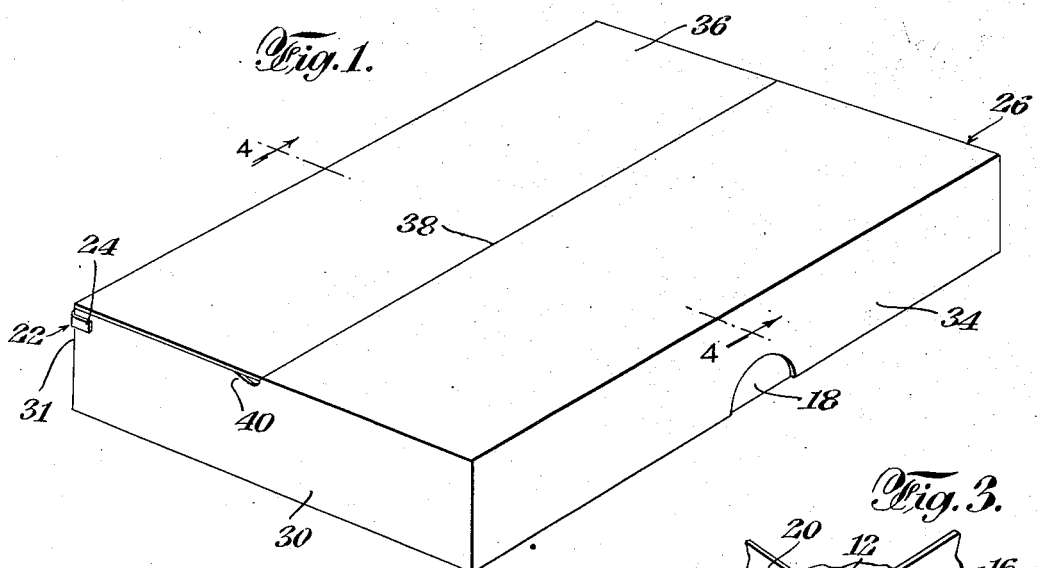
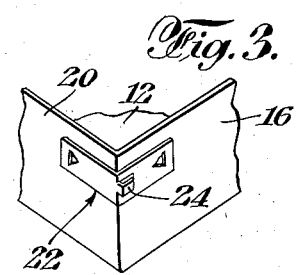
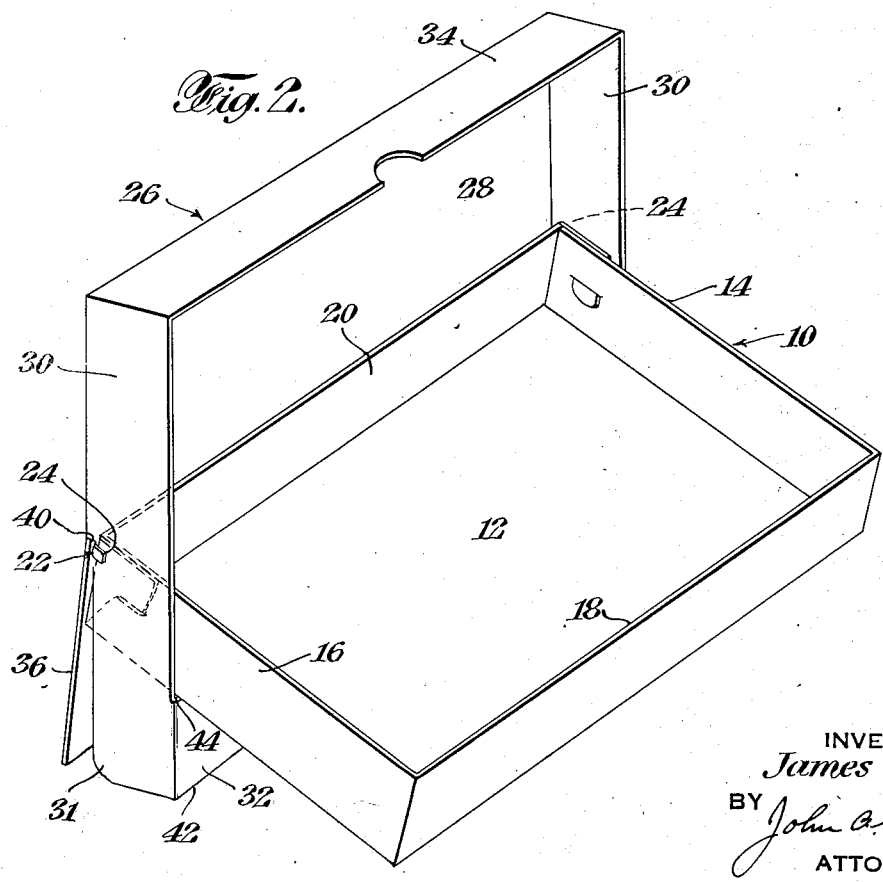
INVENTOR
James Cage
BY John A. Bliss
ATTORNEY Sept. 27, 1938.  J. CAGE  2,131,093
DISPLAY BOX
Filed April 18, 1936  7 Sheets-Sheet 2
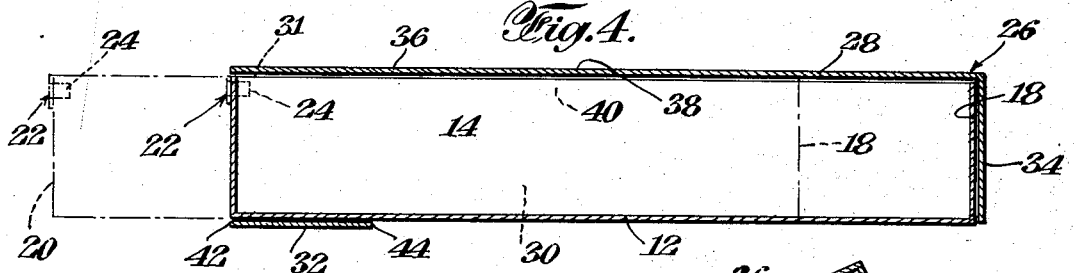
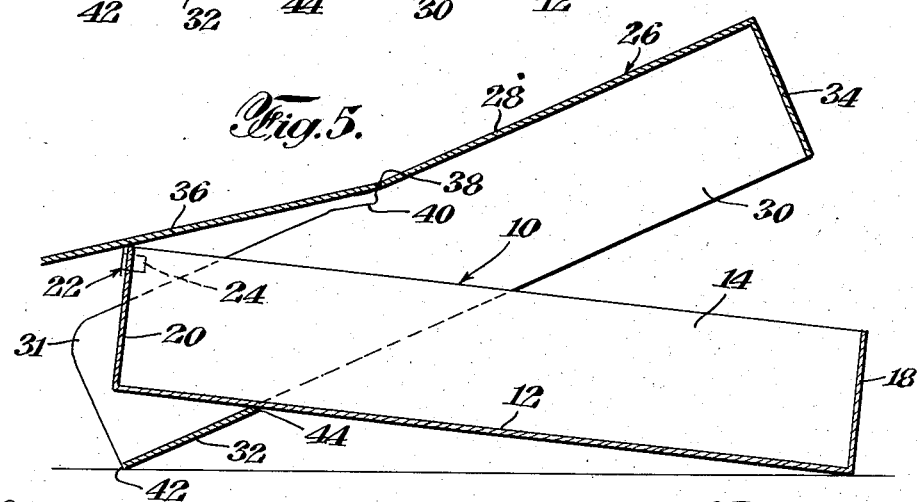
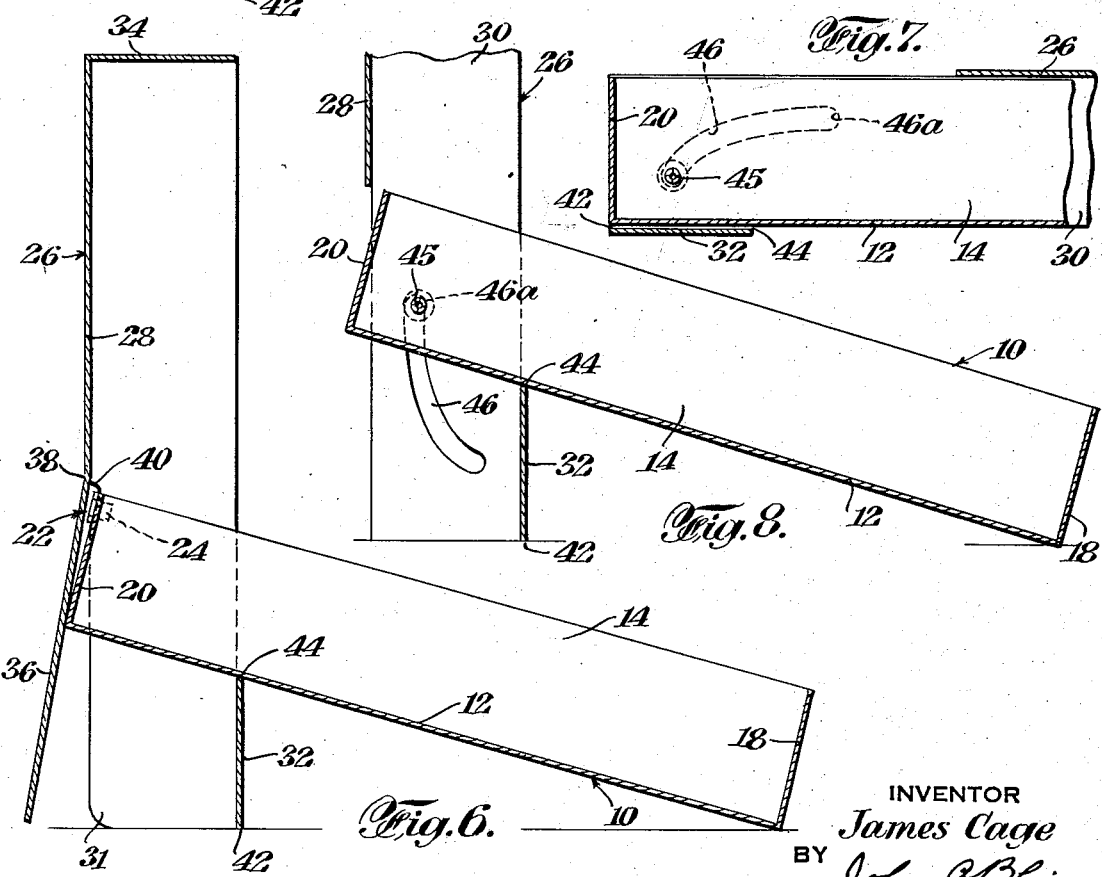
INVENTOR
James Cage
BY John A. Bliss
ATTORNEY Sept. 27, 1938.  J. CAGE  2,131,093
DISPLAY BOX
Filed April 18, 1936   7 Sheets-Sheet 3
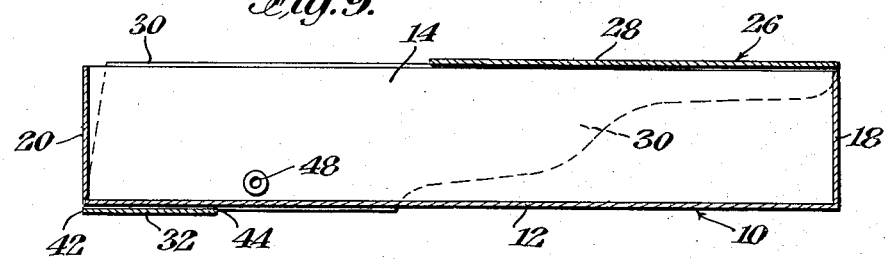
Fig. 9.
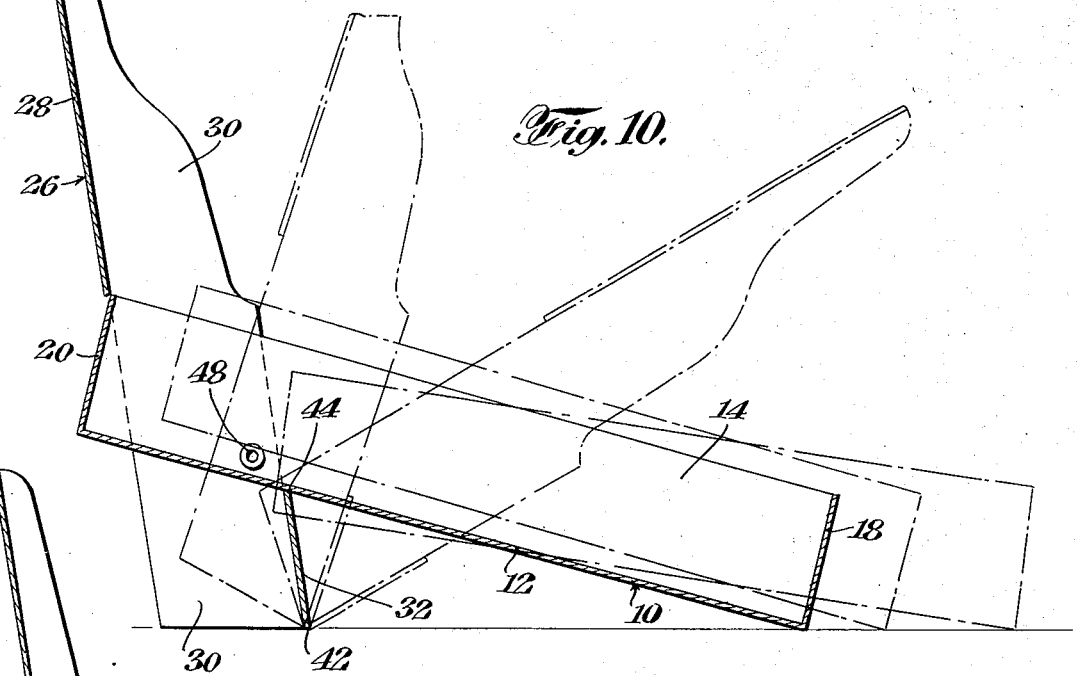
Fig. 10.
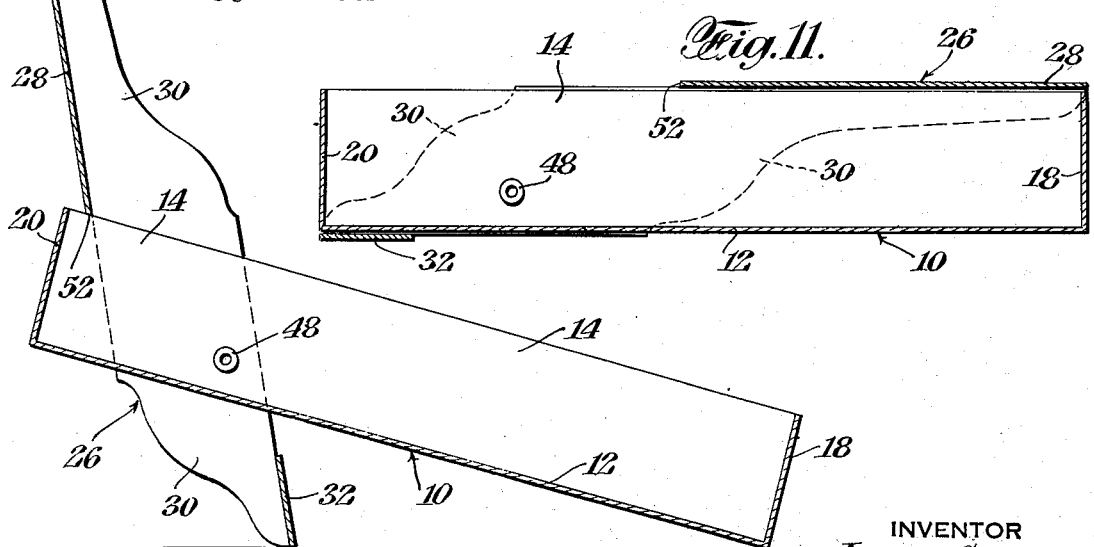
Fig. 11.
Fig. 12.
INVENTOR
James Cage
BY John A Bliss
ATTORNEY Sept. 27, 1938. J. CAGE 2,131,093
DISPLAY BOX
Filed April 18, 1936 7 Sheets-Sheet 4
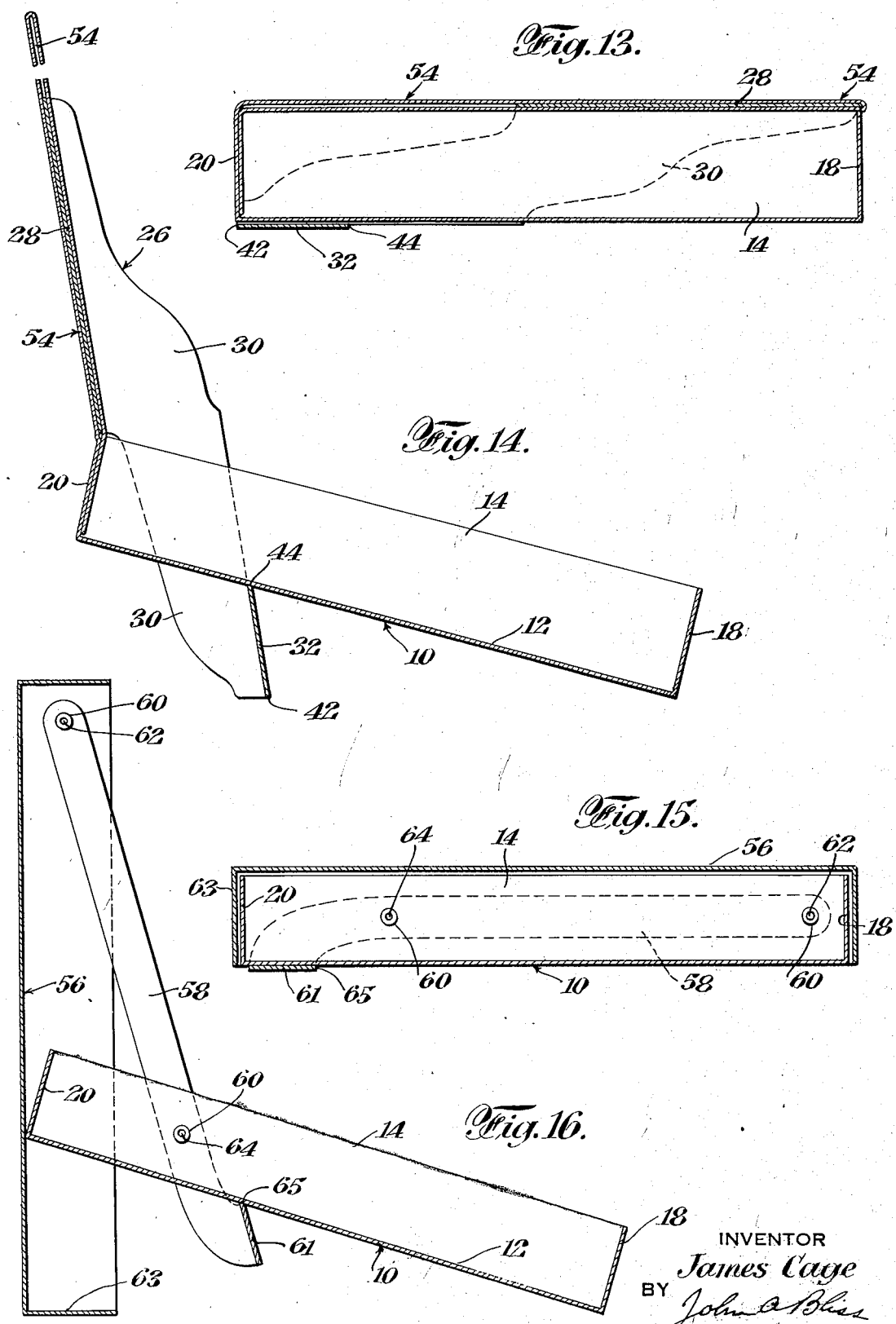
INVENTOR
James Cage
BY John A Bliss
ATTORNEY Sept. 27, 1938.  J. CAGE  2,131,093
DISPLAY BOX
Filed April 18, 1936  7 Sheets-Sheet 5
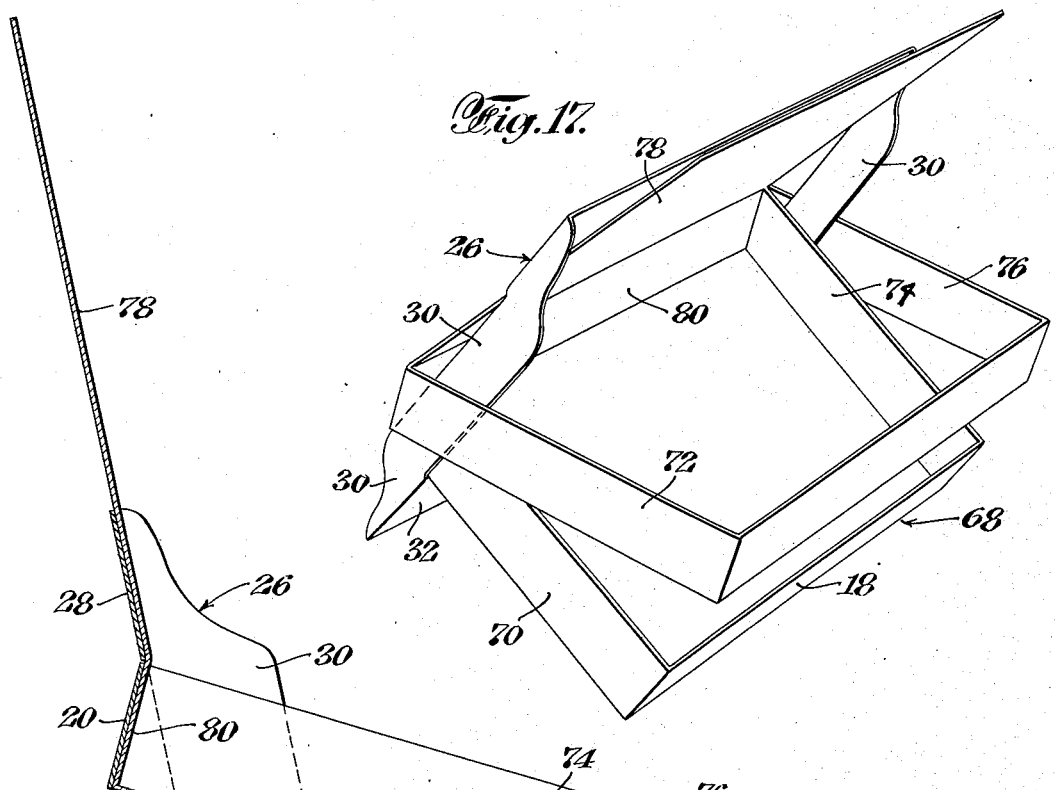
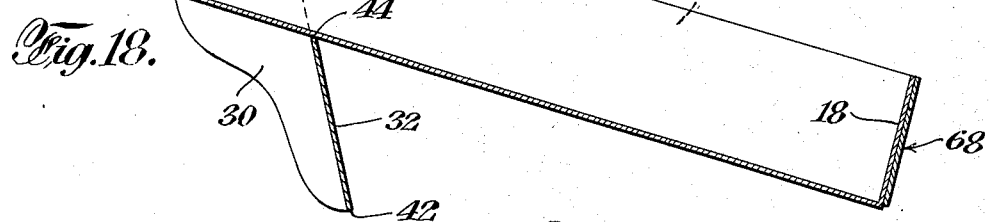
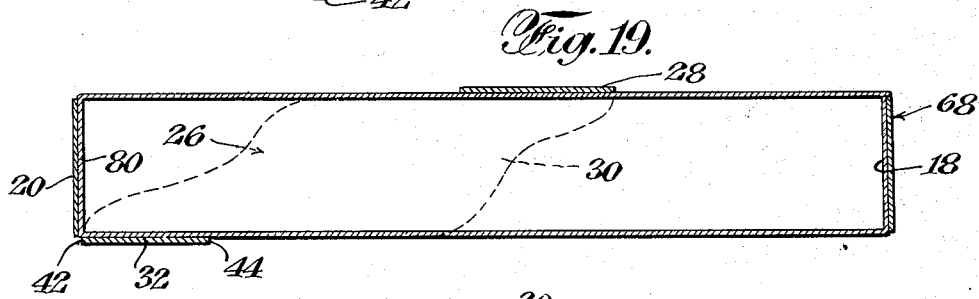
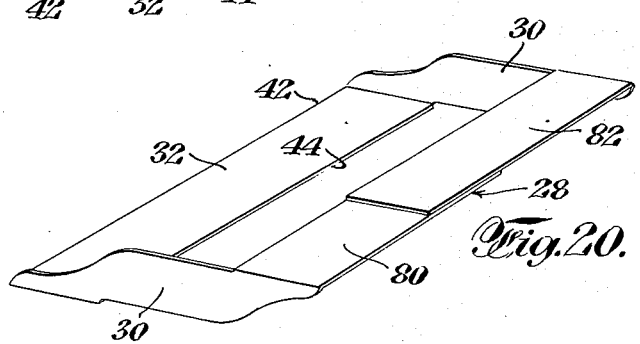
INVENTOR
*James Cage*
BY *John A. Bliss*
ATTORNEY Sept. 27, 1938.  J. CAGE  2,131,093
DISPLAY BOX
Filed April 18, 1936   7 Sheets-Sheet 6
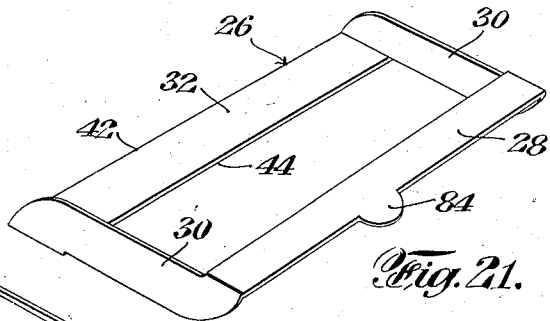
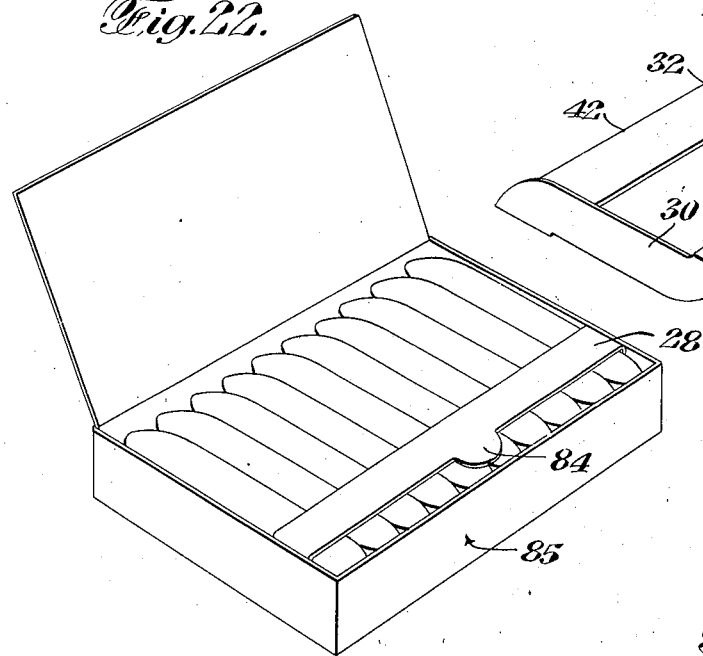
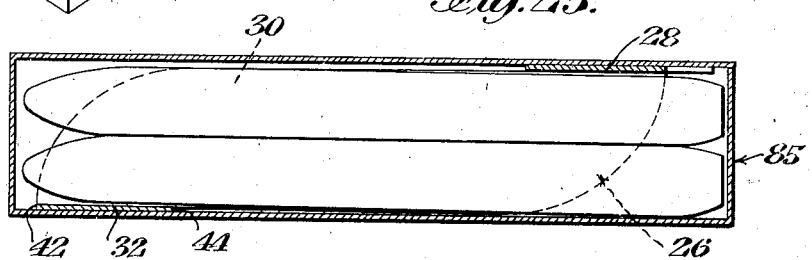
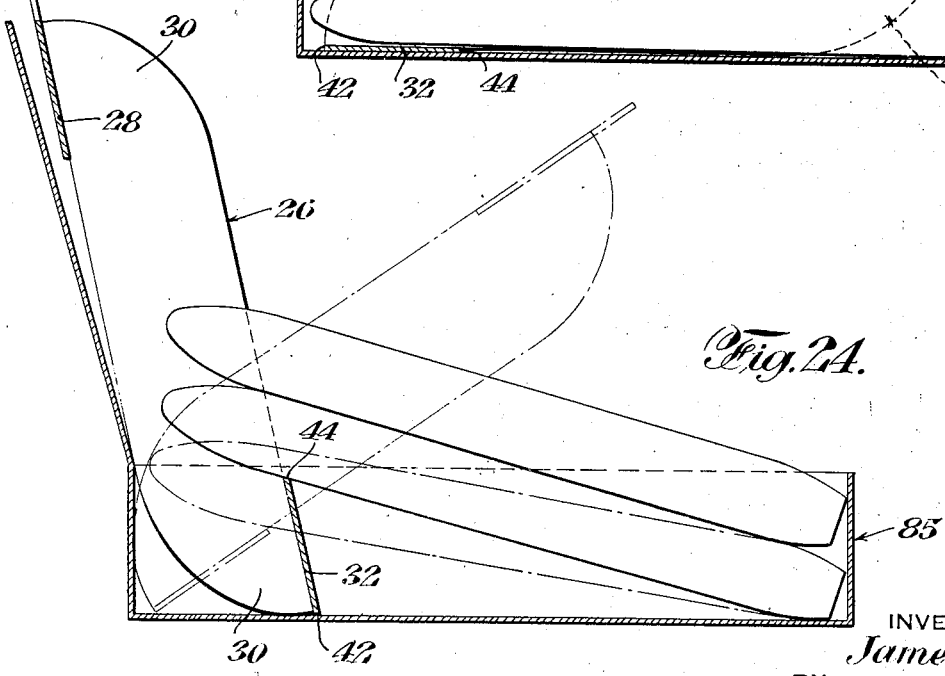
INVENTOR
James Cage
BY John A. Bliss
ATTORNEY

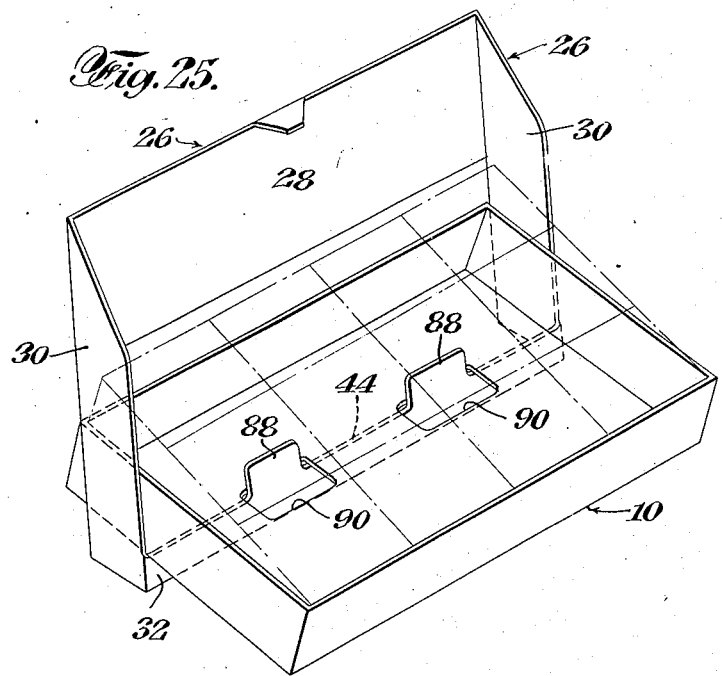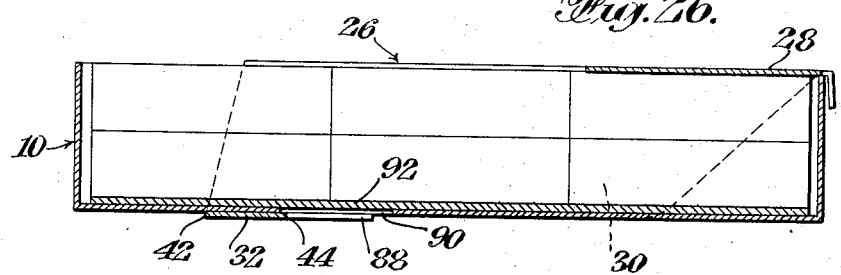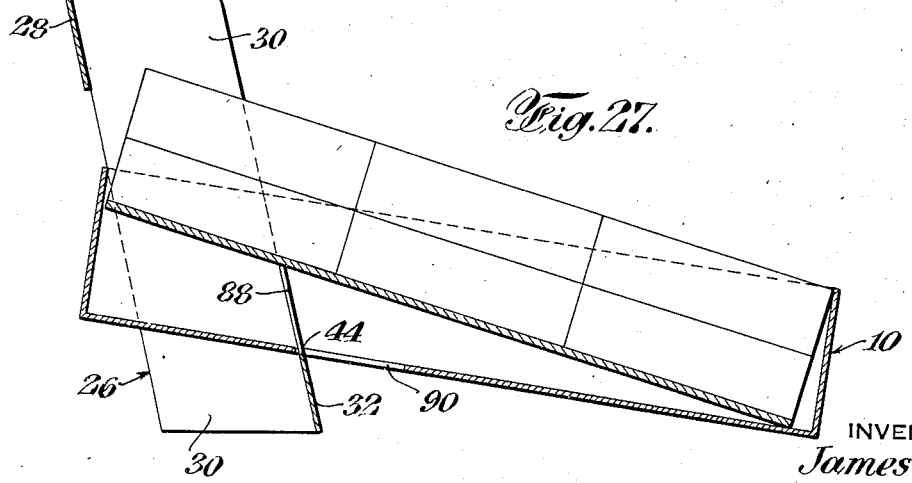

Patented Sept. 27, 1938

2,131,093

UNITED STATES PATENT OFFICE 2,131,093

DISPLAY BOX

James Cage, Valley Stream, N. Y., assignor to Reynolds Metals Company, New York, N. Y., a corporation of Delaware Application April 18, 1936, Serial No. 75,042

6 Claims. (Cl. 206—44)

This invention relates generally to a lever device for automatically tilting trays, containers, boxes or the like, or packaged merchandise, into a display position or into a position for easy removal from a container or container tray; and in particular my invention relates to a lever mechanism which in combination with a box, a box tray or a packaged merchandise is adapted automatically to raise and tilt the same to a predetermined angle from the horizontal merely by the manual raising of the lever and which is further adapted by the lowering of the lever to lower the box, box tray or merchandise to a horizontal position: the device may be so arranged as to assume and retain a tilted position if suitable stop means are provided; also the same tilted lever device means may be used as a gripping means for lifting the entire combination from a position of rest on a display counter, for presentation of the same, open, to a customer.

Heretofore a large number of display structures and devices have been suggested in order to present merchandise in a tilted tray or container in an attractive manner: many forms have employed complicated die-cut and die-scored blanks which are expensive to manufacture and difficult to assemble, and which when assembled require careful loading which slows up the packaging lines of the factory where the goods are being packed; other suggested forms are of no value in packaging products for shipment at the point of production of the goods to be packaged but must be shipped either assembled or in collapsed form to the point of ultimate use where they are used solely for the function of display. None of the prior devices shows a tray or merchandise container adapted to be tilted to an angle by simple manual operation of a lever device, which after the merchandise has been placed upon display can be restored by an equally simple operation.

Therefore it is an object of my invention to provide a lever device which in combination with packaged merchandise is adapted to tilt the latter at an attractive angle.

Another object of my invention is to provide a lever device which in combination with a merchandise container or tray, loaded with merchandise by the usual packing methods, will by a simple raising of the lever place the merchandise at an attractive display angle, and which, coincident with a lowering of the lever, will restore the merchandise to horizontal position.

A further object of my invention is to provide a simple merchandise tilting lever device of a second class lever type which can be readily manufactured from paper or board stock and shipped in collapsed or knock-down form together with an ordinary knock-down box or tray container; the two parts being adapted for easy assembly where the merchandise is packed and placed in an operative position and combination without materially decreasing the speed of normal packaging or cartoning production lines; the said lever device and container not having any projecting ears, tabs, or similar protuberances and so being adapted for easy and economical shipping and packaging.

Another object of my invention is to provide a combined container cover and lever device which in cooperation with a fully loaded tray or container of merchandise is adapted, simply by raising the cover member, to tilt the merchandise, with or without the tray or container as preferred, to an angulated display position; it being possible to provide suitable stop means so that the container or tray, with cover member uplifted, may be retained in a display position.

Another object of my invention is to combine such a merchandise tilting lever device as already described with a flexible cover member adapted to have advertising matter written thereon and to cooperate and be locked in place, as preferred, in either closed or open position.

Other objects and advantages of the invention will become apparent from the following description when taken in connection with the accompanying drawings.

My invention can be readily understood from the accompanying drawings which are set forth merely for the purpose of illustration and are not to be deemed as limiting the scope of the invention as it will be obvious from the drawings and their description that various modifications and changes of the combination of elements illustrated may be made without departing from the spirit of my invention.

In the accompanying drawings wherein like reference characters designate corresponding parts throughout the several views—

Fig. 1 is a perspective view of a tray container with a lever cover device of a second class lever type in closed position thereupon and illustrating an embodiment of my invention;

Fig. 2 is a like view of a lever cover device in open or raised position and the tray in tilted display position;

Fig. 3 is a perspective view of a clip or stop means adapted to stop the lever cover at a predetermined angle as the same raises the tray container;

Fig. 4 is a vertical section taken substantially on the line 4—4 in Fig. 1 together with a tray container illustrated in dot-and-dash lines to show clearly the method of inserting the tray into the lever cover device;

Fig. 5 is similar to Fig. 4 with the lever cover device partially raised and illustrating the partial tilting of the tray coincident therewith;

Fig. 6 is similar to Fig. 4 with the lever cover device in open position and the tray in fully tilted display position;

Fig. 7 is a fragmentary vertical section showing a modified form of stop means and illustrating a tray container and a cover lever device;

Fig. 8 is a fragmentary vertical section substantially similar to Fig. 7 but with the tray illustrated in tilted display position;

Fig. 9 is a vertical cross section of a modification of my invention illustrating a tray container and lever cover device joined together by a fixed pivot;

Fig. 10 is similar to Fig. 9 and shows the device in display position including dot-and-dash line views illustrating the operation of the lever device as the same is raised;

Fig. 11 is a vertical cross section of a modification of my invention as illustrated in Figs. 9 and 10 and shows a variation of the stop means for limiting the lever action;

Fig. 12 is the same as Fig. 11 showing the tray in tilted display position with the lever device fully raised;

Fig. 13 is a vertical cross section of a further modification of my invention of a tray and a lever device wherein the lever device slides within a double cover attached to the container;

Fig. 14 is similar to Fig. 13 but with the container in display position and the lever fully raised;

Fig. 15 is a vertical cross section of another modification of my invention wherein the lever device has arms connected both to a cover and to a tray container by fixed pivots;

Fig. 16 is the same as Fig. 15 but with the cover fully raised and the tray in tilted display position;

Fig. 17 is a perspective view of a further modification of my invention illustrating a double side wall container having a cover in combination with a lever device, the latter having a bar member adapted to maintain the cover in closed position;

Fig. 18 is a vertical cross section of the combination of parts shown in Fig. 17 but in open display position with the lever device fully raised;

Fig. 19 is similar to Fig. 18 but with the container closed and the lever device fully lowered;

Fig. 20 is a perspective view of a lever device indicating how the same may be blanked out of a single blank and then assembled by overlapping the end portions of a top strip or bar either before or after being combined with a container;

Fig. 21 is a perspective view of a modified type of a lever device adapted to cooperate directly with the merchandise within a container;

Fig. 22 is a further modification of my invention showing in perspective a box having a double layer of cigars with a lever device shown in operative association therewith;

Fig. 23 is a vertical section taken substantially upon the line 23—23 of Fig. 22 but with the box with its cover closed;

Fig. 24 is similar to Fig. 23 showing the lever device in fully raised position with the cigars tilted upwardly at one end thereby and also includes a view of the device partially raised in dash-and-dot lines to show the progressive operation of the combination;

Fig. 25 illustrates a further modification of my invention showing a perspective view of a lever cover device in raised position, adapted not only to tilt a tray container but also to tilt any merchandise therein directly by bearing against a platform under the said merchandise;

Fig. 26 is a vertical cross section of the structure shown in Fig. 25 substantially along the line 26—26 but with the cover device in closed position; and Fig. 27 is a vertical section similar to Fig. 26 but with the lever cover device in fully raised position.

It will be noted that in all of the illustrative figures the essence of my invention is the provision of a lever device of a second class lever type which by either being raised or lowered induces a coincident raising or lowering of a tray of merchandise at a place against which the lever bears. When the lever is raised the tray or container of merchandise is raised and when the lever is lowered there is automatic lowering of the tray or container of merchandise to a horizontal position.

In Figs. 1-6 a tray container 10 may be constructed as usual of any material such as paper having a requisite body and be provided with a bottom 12 and side walls 14, 16, 18 and 20, as indicated. On the rear side walls 20 of the tray container 10 some kind of stop means, preferably a metal clip 22, is ordinarily stapled or otherwise positioned and provided with a right angle arm 24 which may be disposed towards the front of the tray 10 but with a slight space between the arm 24 and the side wall 16. A similar stop, also indicated as 22, will ordinarily be likewise provided upon the other end of the rear side wall 20. Such a tray container 10 can be made by the usual blanking methods and shipped in flat knock-down form and assembled by folding as indicated in Fig. 2, at the merchandise production plant where it is desired to package the merchandise; also such a tray 10 can be fully packed with merchandise as usual without slowing up the normal packing lines such as are customary in modern plants.

The lever cover device 26 illustrated in Figs. 1-6 comprises a flat top or cover strip 28 connected by suitable walls 30 to a flat bottom strip or fulcrum portion 32. If desired a depending front wall 34 as indicated may be provided to cover the front of the tray 10; also to complete the cover, the cover strip 28 may have a supplemental loose skirt or flap part as at 36 which may be integral with top strip 28 but in part separated therefrom by score line 38 so that the flap cover part 28 may move arcuately with respect to side walls 30 of the lever device. If desired the supplemental flap 36 may be omitted or be made of a transparent substance of the type of regenerated cellulose or glassine paper. Ordinarily the top rear corners of the side walls 30 will be rounded as indicated at 31 so as to easily ride past stops 22. A suitable notch or shoulder 40 is provided in the side walls 30 which the stops 22 may engage. It is obvious that the lever cover device may be made of an integral blank of paper and shipped in a flat knock-down form; and will be of such size and proportion that the tray 10 may enter its confines and nest without binding.

In operation the tray 10 will ordinarily be packed with merchandise and slipped within the confines of the lever cover device 26 through the open back thereof as indicated by Fig. 4 so that the cover may protect and cover the contents of the tray. Simply by lifting the front flange 34 or the cover portion 28 upwardly, the tray 10 by virtue of the fulcrum portion or strip 32 is tilted. The lever cover has a relative sliding and swinging movement in respect to the tray container. Fulcrum strip 32 is ordinarily a flat horizontal strip of paper or other material underlying and not projecting beyond the bottom 12 of the container 10; the edge portion 42 serves as an axis of revolution for the lever device and the lifting force is applied against the bottom of the container by edge 44 of the fulcrum strip. It will be obvious from the description and drawings that the parts may be made to effect various tilting angles to the tray in its raised position. By so arranging the lever device so that its side walls 30 are at an angle of 90° or greater from horizontal when the stops 22 engage the notches 40 a stable display structure is assured. A forward and lowering movement of the lever cover device 26 results in a concurrent lowering of the tray container and the combination of parts assume original or starting position automatically as in Fig. 4 when the side walls 30 of the lever cover device are in horizontal position; if the tray 10 is not entirely within the confines of the lever device 26 the same may be placed in such position merely by forward pressure exerted thereagainst manually.

In Figs. 7 and 8 a modified form of my invention is indicated wherein the lever and container when assembled are not separable, the means effecting this serving as stop means and may comprise projecting studs or pins 45 positioned in side walls 14 and 16 of the container 10 and which slidably engage slots 46 formed in side walls 30 of the lever cover device 26. The shape of said slots 46 being generated by the traversed path of the pins during relative motion between the lever and the container; the end 46a of the slot 46 serves as the open limit stop as indicated in Fig. 8. That is during the raising of the lever cover, the container is raised by the edge 44 of the fulcrum strip 32 until the pins abut the end 46a of the slot 46. Holding the pins 45 captive in the slots 46 as illustrated, gives a stable structure which may be lifted in its entirety.

A further modification of my invention is indicated by Figs. 9 and 10 in which rivets 48 are employed as fixed pivots to join side walls 30 of the lever cover device 26 to the side walls 14 and 16 of the tray container 10. As the lever device is raised edge 42 of fulcrum strip 32 serves as an axis of revolution and lifting edge 44 presses upwardly upon the container 10 tilting the same. If desired, the edge portion 50 of side walls 30 of the lever cover device may be blanked out of the stock at an oblique angle, as indicated, and the device so arranged that when the lever cover is fully raised the oblique edge portion 50 is in horizontal position, thus giving the display combination additional stability. In the form of my invention illustrated in Figs. 9 and 10 edge portion 44 of the fulcrum strip 32, when the lever cover device is fully raised, may serve as a stop preventing a further rotation of the lever device about the pivots 48. The engagement of the edge 44 with the bottom of the container enables the lifting of the entire device in open position, by grasping and lifting the cover portion 28.

In a modified form of my invention illustrated in Figs. 11 and 12 the limit stop for the lever device is accomplished by engagement of the portion 28 with the upper edges of the container or tray. The lever cover device 26 revolves about edge portion 42 of fulcrum strip 32 but the lever cover device is permanently attached to the tray 10 by fixed pivots such as rivets 48 as in the foregoing modifications. In this form the tray 10 is tilted by power applied thereto by the lever against the pivots 48. As the lever cover device is opened fully the parts may be so arranged that edge portion 52 of cover strip 28 is adapted to bear against side walls 14 and 16, thus providing a stop to prevent further revolution of the lever cover device; furthermore, by properly arranging the pivot points and the side walls or arms 30 of the lever cover device the lever cover device may be raised more than 90° from horizontal assuring stability when opened and at the same time providing lifting facilities.

Figures 13 and 14 illustrate the type of tray 10 and lever cover device 26 shown in Figs. 1–6 but these figures further show the cover strip 26 as indicated, slidably positioned within a double paper cover 54 which latter may be pasted or otherwise clipped or positioned upon the rear wall 20 of the tray 10 when the lever device 26 may be so arranged that its further revolution is stopped by contact against rear wall 20 of container 10. The encompassing double walls of the double paper cover 54 tend to retain the cover strip 26 in a plane parallel thereto at all times. This form of my invention is advantageous because the entire container is fully covered when the lever mechanism is lowered and when the same is raised the inner surface of the cover 54 forms an attractive display surface. Also it is not necessary to provide any rivets for fixed pivots or mechanical stops, other than that inherent in the structure as described, which would require additional manufacturing operations.

The modified form of my invention indicated by Figs. 15 and 16 comprises a tray container 10 with a usual form of cover 56 loosely associated therewith. Interposed between the side walls of the tray 10 and the side walls of the cover 56 are elongated lever arms 58 pivoted by rivets or pins 60 at points 62 and 64 respectively to both the side walls of the tray 10 and the cover 56. A flat strip member 61 may be used to join the end portions of lever arms 58 in order to give strength to the structure and to serve to restrict the rotation of the lever arms 58. As cover member 56 is raised, the strip member 61 first operates as a fulcrum member, and the tray is then forced upwardly by force applied to rivets 60 at the point 64; as the cover is raised further its end portion 63 bears against the counter surface. As indicated when the cover 56 is fully raised to a vertical position, edge portion 65 of strip 61 operates in conjunction with the bottom of the cover 56, as a stop member.

Figs. 17, 18 and 19 illustrate a further modified form of my invention wherein the lever cover device 26 may be in the form already described in connection with Figs. 1–6 but wherein it is employed with a double walled box 68 having double side walls 70, 72, 74 and 76 and preferably a cover 78. The cover lever device side walls 30 are slipped between double side walls 70 and 72, and 74 and 76, as indicated in Fig. 17 and the box then may be assembled merely by pushing the double side walls together so that their edges are substantially parallel. Rear wall 80 forms a stop for the lower device 26 and the top strip 28 thereof tends, when the lever device is in lowered position, to lock the cover 78 of the box in closed position. Top strip 28 forms a support for the cover 78 when in opened position and also serves, in common with other forms illustrated, as a lifting means for the entire combination, in this instance the container 18 being cradled in the lever device 26 and locked between top strip 28 and bottom strip 32. Operation otherwise of the device is similar as heretofore described. Fig. 20 illustrates a lever device which may be stamped out of a flat blank of material so as to provide a flat bottom strip or fulcrum portion 32, side walls 30, and a substantially flat cover strip 28 formed of two overlapping strips indicated as 80 and 82 respectively. The overlap of the cover strips may be joined by adhesive, as indicated, or by clipping, either before or after the assembly of the device as indicated in Fig. 17.

Fig. 21 illustrates a form of lever device having a tab 84 projecting forwardly thereof. This type of cover lever device as shown in Figs. 22, 23 and 24 is adapted to be used so that its lifting force is applied directly to merchandise. In the example shown, cigars, extending substantially the full width of the box container 85, are packed in above bottom strip or fulcrum portion 32 of the lever cover device 26. When the lever member is raised by tab 84 the cigar ends above bottom strip 32 are tilted upwardly as indicated in Fig. 24 where they may be easily removed from the box by such raised ends. It is obvious that packaged merchandise in elongated containers would operate upon the same principle. As illustrated by Figs. 25, 26 and 27 a further modification of my invention is possible by providing tabs or projections 88 upon edge portion 44 of fulcrum strip 32. These tabs or projections are adapted, when the lever cover device is raised, to project through slots 90 in the bottom 12 of tray container 10 and bear against a platform 92 inserted over the bottom 12 of the tray. Merchandise packed upon the platform is tilted upwardly out of the tray when the lever cover device is raised and at the same time the operation of the bottom of the fulcrum strip of the lever cover device is as usual.

As various possible embodiments might be made of the above invention and as various changes might be made in the embodiments set forth it is to be understood that all matter herein set forth or shown in the accompanying drawings is to be interpreted as illustrative and not in a limiting sense, and therefore the invention is not to be limited to what is described in the specification and shown in the drawings but only as indicated in the appended claims.

What I claim is:

1. In combination, a container for merchandise and a lever cover device of a second class lever type adapted to encompass the container to permit relative sliding and swinging movements of the lever cover device with respect to the container and adapted to tilt the latter to an inclined position, the said lever cover device comprising a flat bottom strip underlying the container, elongated side walls attached to said bottom strip extending forwardly and upwardly, and a top strip connecting the upper ends of said side walls, said flat strip normally flatly underlying the container when the latter is untilted and automatically tilting the container when the lever cover is raised, by pressure exerted by an edge portion of said strip against the bottom of the container, metal clips positioned upon the container at the rear upper corners thereof and encompassing in part the elongated side walls when the lever cover device is raised and adapted to limit the swinging movement of the lever device, and notches provided in the said elongated side walls of the said lever device adapted for engagement by the said clips.

2. In combination, a container having side walls and a bottom, a flexible cover attached to said container and formed of material folded back upon itself so as to provide a loop of material having closed end portions but free side portions, and a lever tilting device of a second class lever type associated with said container adapted for sliding and swinging movements relative thereto and adapted for tilting the said container to an inclined position for display purposes, the said lever tilting device comprising a bottom or fulcrum strip underlying the container, a top or lifting strip inserted within the loop of the double cover, and elongated side walls connecting bottom and top strips whereby when the cover is swung upwardly the container is tilted from a horizontal to an inclined position and when the cover is lowered the container resumes its original position.

3. In combination, a container having a bottom and double side walls and a lever cover device associated with said container adapted for sliding and swinging movements relative thereto and adapted for tilting said container to an inclined position for display purposes, said lever tilting device comprising a bottom or fulcrum strip underlying the container, a top or lifting strip overlying the side walls of the said container and elongated side walls connecting the bottom and top strips, the said elongated side walls being positioned between the double walls of said container and being adapted to slide therebetween in a vertical plane.

4. In combination, merchandise packaged in a box-like container and a second-class lever device for automatically tilting the merchandise comprising an elongated rectangular bottom strip member serving as a fulcrum and normally located below said merchandise in a horizontal plane and extending from one side of the merchandise to the other, elongated side wall members formed of flat strip material attached to the ends of said bottom strip member positioned in vertical planes at the outer sides of the merchandise and movable in said planes, said side wall members extending forwardly and upwardly with respect to said bottom member, and a top member of rectangular form normally flatly overlying the merchandise and attached to said side wall members forwardly thereof relative to said bottom strip member, whereby when said top member is swung upwardly said bottom strip member is rotated upon its longitudinal axis with one edge operating as a fulcrum for the lever device and the other edge operating to lift the merchandise.

5. In combination, a box-like container for merchandise and a second-class lever device for automatically tilting said container associated therewith and comprising an elongated rectangular bottom strip member serving as a fulcrum and normally underlying the container in a horizontal plane and extending from one side of the container to the other, elongated side members formed of flat strip material attached to the ends of said bottom strip member positioned in vertical planes, said side members extending forwardly and upwardly with respect to said bottom strip member, and a top bridge member formed of sheet material connected to said side members forwardly thereof relative to said bottom member and normally flatly overlying the container whereby when the bridge member is swung upwardly one edge of said bottom strip member operates as a fulcrum and the other edge operates to tilt the container upwardly.

6. In combination, material arranged in rectangular box-like form and movable as a unit, and a second class lever tilting device associated therewith comprising an elongated rectangular bottom strip member serving as a fulcrum flatly underlying said material in a horizontal plane and extending from one side of the material to the other, two elongated side wall members positioned in vertical planes adjacent the sides of said material and attached to said bottom strip member at the ends thereof, said side wall members extending upwardly and forwardly with respect to said bottom member, and a top bridge normally flatly overlying said material and attached to said side walls members forwardly thereof relative to said bottom member, whereby when said top member is raised the material is tilted upwardly.

JAMES CAGE.